US012590980B2

(12) United States Patent
Makino et al.

(10) Patent No.: US 12,590,980 B2
(45) Date of Patent: Mar. 31, 2026

(54) AUTOMATIC ANALYSIS DEVICE

(71) Applicant: Hitachi High-Tech Corporation,
Tokyo (JP)

(72) Inventors: Yoko Makino, Tokyo (JP); Masashi Shibahara, Tokyo (JP); Toshiki Yamagata, Tokyo (JP)

(73) Assignee: Hitachi High-Tech Corporation,
Tokyo (JP)

( * ) Notice: Subject to any disclaimer, the term of this patent is extended or adjusted under 35 U.S.C. 154(b) by 532 days.

(21) Appl. No.: 18/025,488

(22) PCT Filed: Sep. 15, 2020

(86) PCT No.: PCT/JP2020/034851
§ 371 (c)(1),
(2) Date: Mar. 9, 2023

(87) PCT Pub. No.: WO2022/059057
PCT Pub. Date: Mar. 24, 2022

(65) Prior Publication Data
US 2023/0366901 A1     Nov. 16, 2023

(51) Int. Cl.
*G01N 35/10* (2006.01)
*G01N 35/00* (2006.01)

(52) U.S. Cl.
CPC ... *G01N 35/10* (2013.01); *G01N 2035/00435* (2013.01); *G01N 2035/1051* (2013.01)

(58) Field of Classification Search
None
See application file for complete search history.

(56) References Cited

U.S. PATENT DOCUMENTS 5,510,082 A * 4/1996 Arai ................. G01N 35/00029
422/63
8,007,722 B2 * 8/2011 Mototsu ............. G01N 35/1002
422/65
9,341,640 B2 * 5/2016 Shintani ................. G01N 21/03
(Continued)

FOREIGN PATENT DOCUMENTS

CN          205263104 U      5/2016
JP            9-72915 A        3/1997
(Continued)

OTHER PUBLICATIONS

International Search Report (PCT/ISA/210) issued in PCT Application No. PCT/JP2020/034851 dated Nov. 24, 2020 with English translation (seven (7) pages).
(Continued)

*Primary Examiner* — Brian R Gordon
(74) *Attorney, Agent, or Firm* — Crowell & Moring LLP

(57) ABSTRACT

An automatic analysis device includes a control unit, a switch, a reagent jacket, and a sliding contact mechanism. The control unit is configured to drive a motor that rotates the rotation shaft to rotate the reagent jacket. The switch is configured to switch the sliding contact mechanism between a state of the scraper being in contact with an inner wall surface of the housing and a state of the scraper being spaced away from the inner wall surface of the housing. The reagent jacket has a hole blocking part positioned beneath the dispensing hole. The sliding contact mechanism is provided on the hole blocking part.

7 Claims, 18 Drawing Sheets

(56) References Cited

U.S. PATENT DOCUMENTS

| | | | | |
|---|---|---|---|---|
| 2001/0024832 A1* | 9/2001 | Seto | ................. | G01N 35/00029 |
| | | | | 436/46 |
| 2002/0155590 A1* | 10/2002 | Gebrian | ............... | G01N 35/025 |
| | | | | 422/63 |
| 2002/0158082 A1* | 10/2002 | Gaillard | ............. | G01N 35/1097 |
| | | | | 222/134 |
| 2009/0124015 A1* | 5/2009 | Dussi | .................. | G06F 3/04817 |
| | | | | 211/13.1 |
| 2011/0223063 A1 | 9/2011 | Katsumi et al. | | |
| 2020/0225256 A1* | 7/2020 | Fukaya | .................. | G01N 35/10 |
| 2022/0074826 A1* | 3/2022 | Jørgensen | ............. | G01N 21/01 |
| 2023/0341429 A1* | 10/2023 | Hirato | ...................... | G01N 1/00 |

FOREIGN PATENT DOCUMENTS

| | | | |
|---|---|---|---|
| JP | 2009-139269 A | 6/2009 |
| JP | 2011-191117 A | 9/2011 |
| JP | 2014-6140 A | 1/2014 |
| JP | 5953140 B2 | 7/2016 |
| JP | 2016-206113 A | 12/2016 |
| JP | 2018-40578 A | 3/2018 |

OTHER PUBLICATIONS

Japanese-language Written Opinion (PCT/ISA/237) issued in PCT Application No. PCT/JP2020/034851 dated Nov. 24, 2020 (five (5) pages).

* cited by examiner

[FIG. 1]
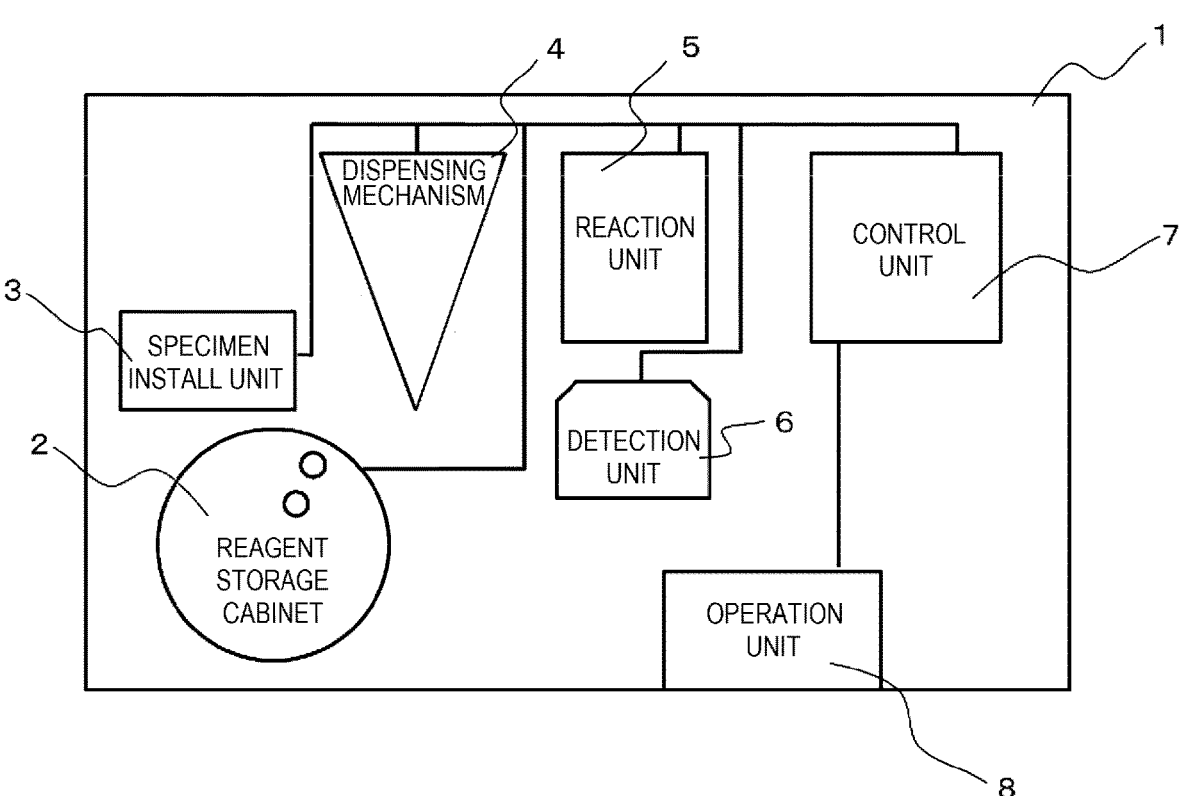

[FIG. 2]
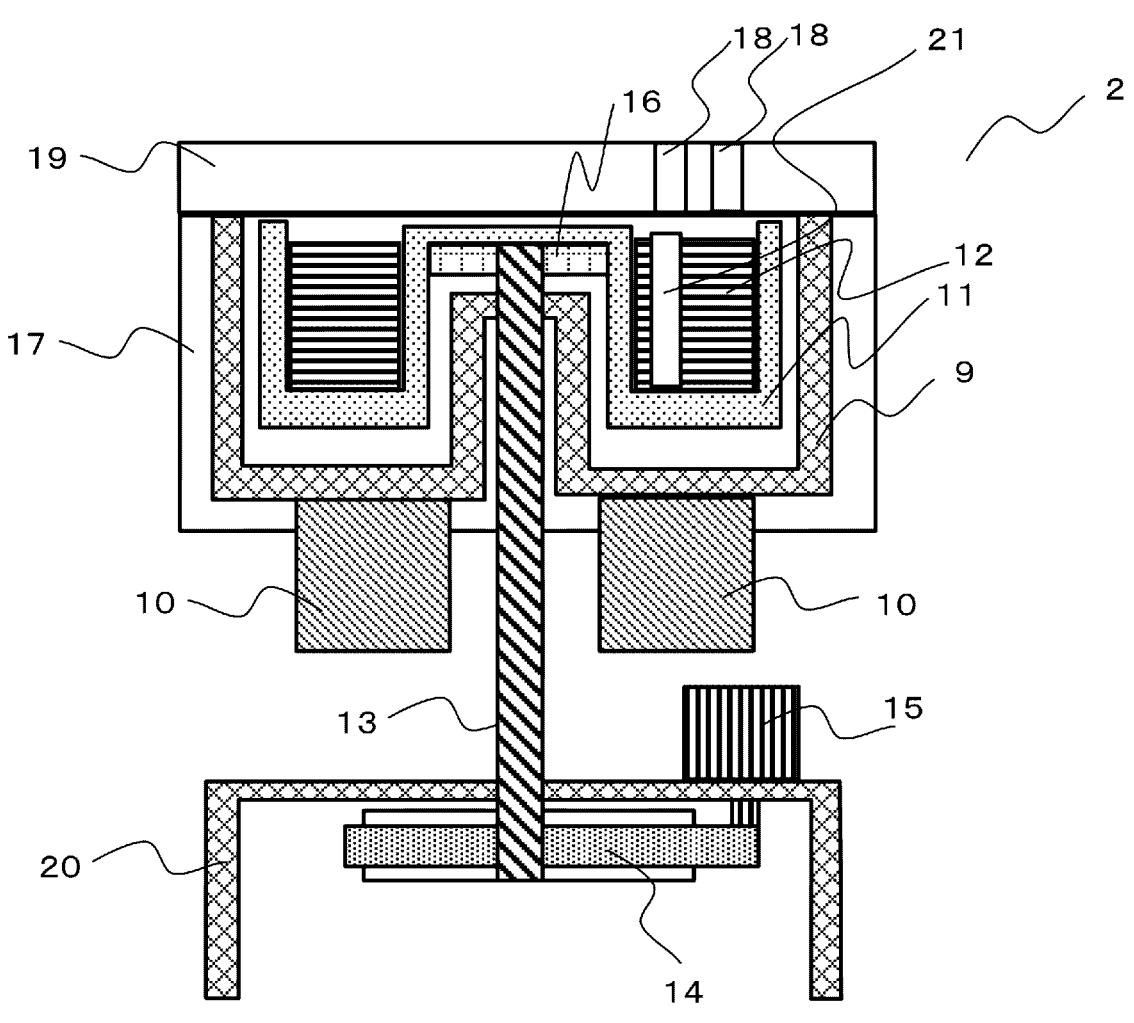

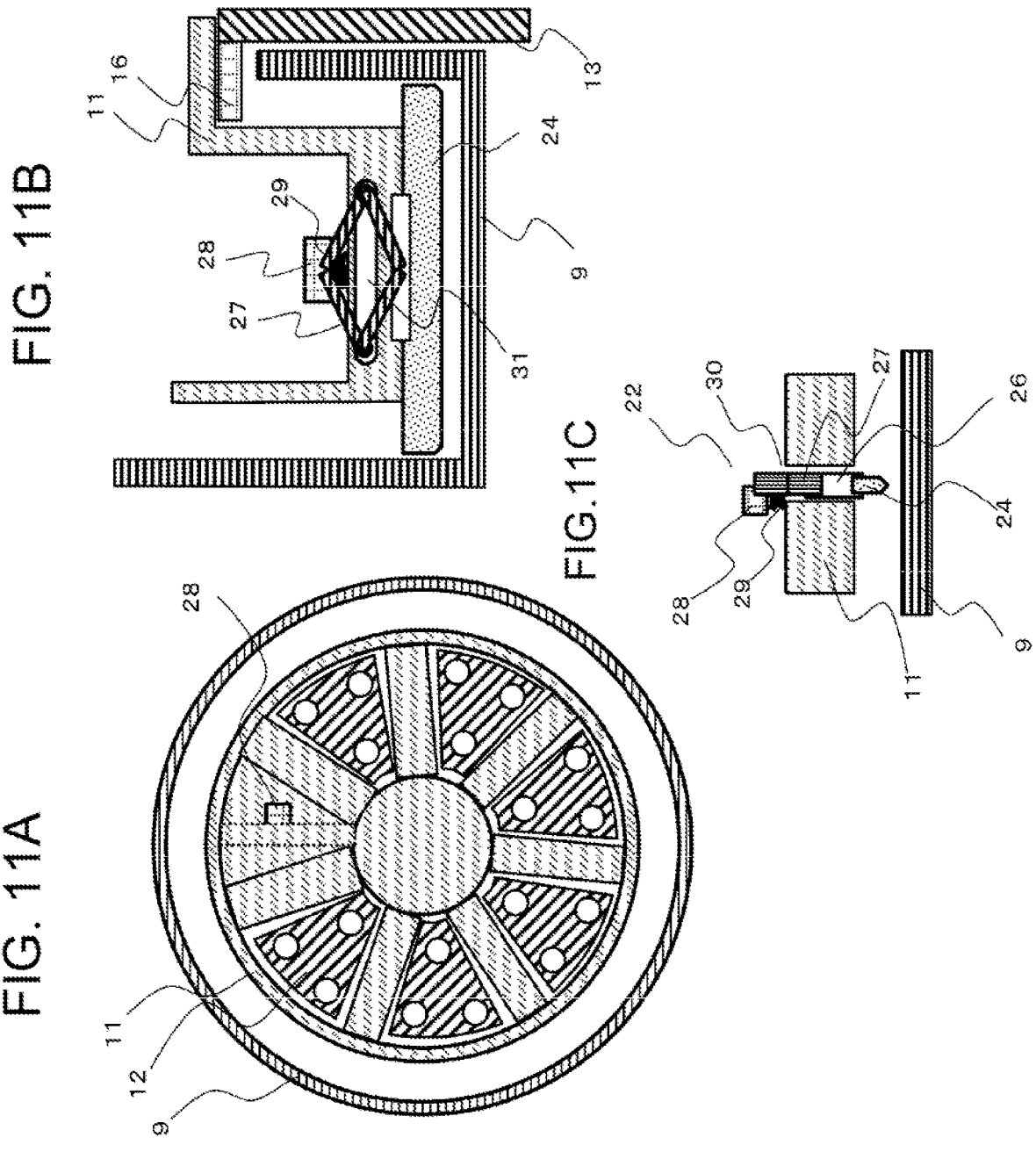

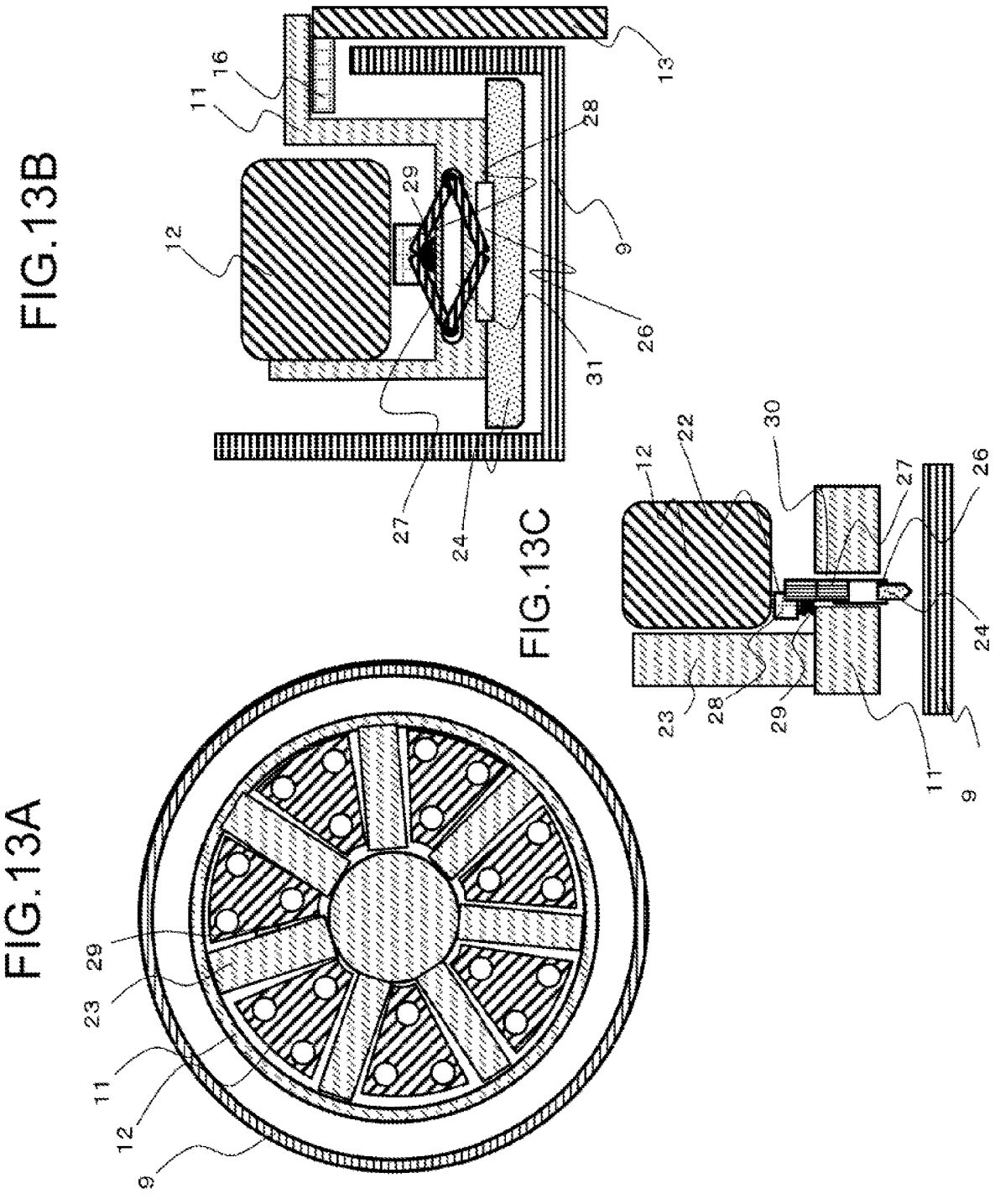

[FIG. 17]
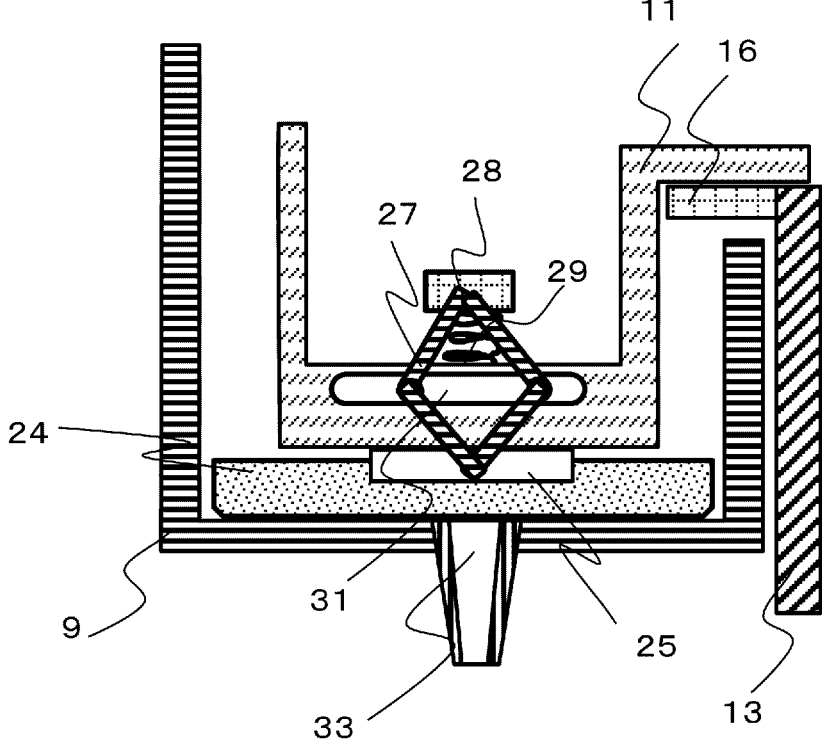
[FIG. 18]
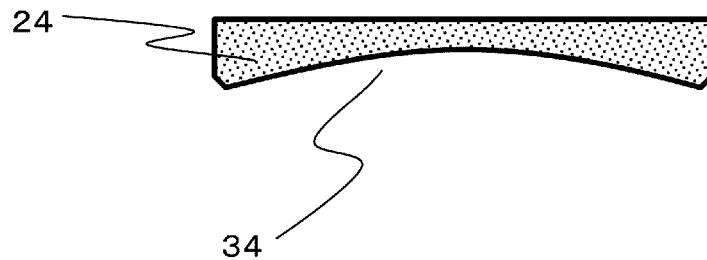

[FIG. 19]
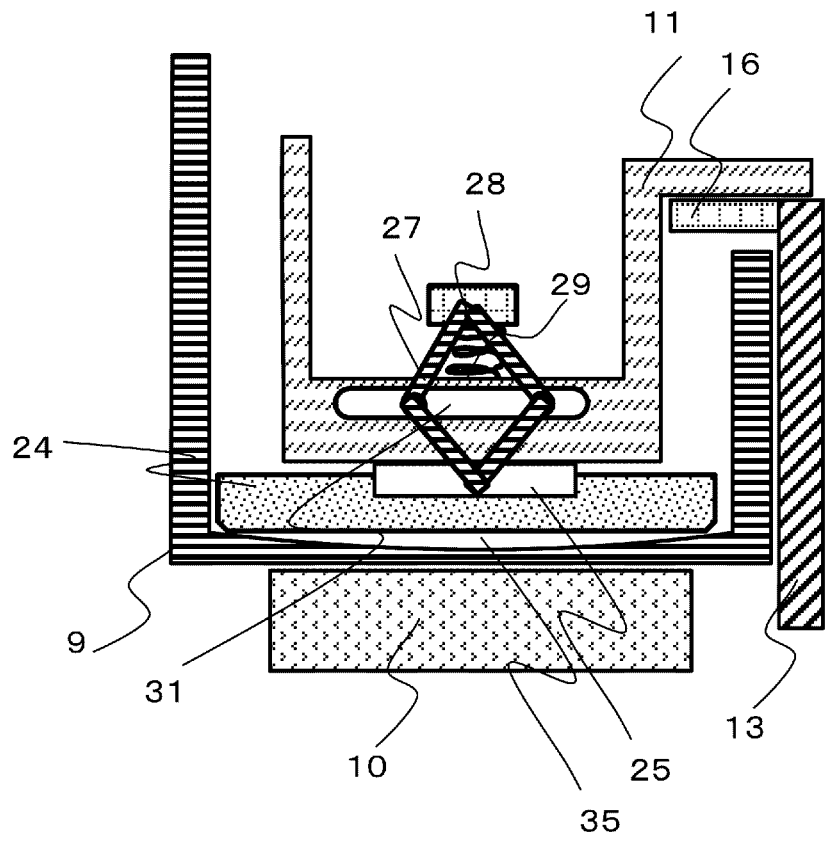

AUTOMATIC ANALYSIS DEVICE

TECHNICAL FIELD

The present invention relates to an automatic analysis device.

BACKGROUND ART

An automatic analysis device that analyzes a specimen (blood, urine, or the like) has a reagent storage cabinet for storing a reagent for testing the specimen. By cooling an inner wall of the reagent storage cabinet, inside air is cooled by a heat transfer effect and the reagent is cooled, and at this time, dew condensation occurs due to a temperature difference between the inside air and the inner wall. When time elapses in a state in which the dew condensation occurs on the inner wall of the reagent storage cabinet, mold and the like is generated, and when mold and the like is mixed into the reagent, an analysis accuracy may be lowered. Therefore, in the related art, dew condensation water is, for example, manually wiped off, which requires time and labor. In this regard, PTL 1 discloses an automatic analysis device in which an elastic member that is in contact with an inner wall of a reagent storage cabinet is provided and dew condensation water is removed by the elastic member.

CITATION LIST

Patent Literature

PTL 1: Japanese Patent No. 5953140

SUMMARY OF INVENTION

Technical Problem

However, in the automatic analysis device described in PTL 1, the elastic member is constantly in contact with the inner wall of the reagent storage cabinet, and thus the elastic member wears quickly and there is a possibility that an operation of frequently replacing the elastic member occurs.

An object of the invention is to provide an automatic analysis device with excellent workability while removing dew condensation water that is generated on an inner wall of a reagent storage cabinet.

Solution to Problem

In order to solve the above problem, the invention provides an automatic analysis device including a reagent storage cabinet that stores a plurality of reagent containers. The reagent storage cabinet includes a reagent jacket that rotates while holding the reagent containers, a housing that accommodates the reagent jacket, and a lid part that covers the housing from above and that has formed therein a dispensing hole for dispensing the reagent inside the reagent containers. A sliding contact mechanism, which is capable of switching between a state of being in contact with an inner wall surface of the housing and a state of being spaced away from the inner wall surface of the housing, is provided to the reagent jacket.

Advantageous Effects of Invention

According to the invention, it is possible to provide the automatic analysis device with excellent workability while removing the dew condensation water that is generated on the inner wall of the reagent storage cabinet.

BRIEF DESCRIPTION OF DRAWINGS

FIG. 1 is a diagram showing an outline of a configuration of an automatic analysis device according to an embodiment of the invention.

FIG. 2 is a cross-sectional view of a reagent storage cabinet according to the embodiment of the invention.

FIG. 3B is a cross-sectional view of a main part in a vertical direction.

FIGS. 4A and 4B are diagrams showing a state in which the switch of the sliding contact mechanism according to the first embodiment turns OFF, FIG. 4A is a horizontal cross-sectional view, and FIG. 4B is a cross-sectional view of the main part in the vertical direction.

FIGS. 5A and 5B are diagrams showing a state in which a switch of a sliding contact mechanism according to a second embodiment turns ON, FIG. 5A is a horizontal cross-sectional view, and FIG. 5B is a cross-sectional view of a main part in a vertical direction.

FIGS. 6A and 6B are diagrams showing a state in which the switch of the sliding contact mechanism according to the second embodiment turns OFF, FIG. 6A is a horizontal cross-sectional view, and FIG. 6B is a cross-sectional view of the main part in the vertical direction.

FIG. 7B is a cross-sectional view of a main part in a vertical direction.

FIG. 8A is a horizontal cross-sectional view, and FIG. 8B is a cross-sectional view of the main part in the vertical direction.

FIGS. 9A and 9B are diagrams showing a state in which a switch of a sliding contact mechanism according to a fourth embodiment turns ON, FIG. 9A is a horizontal cross-sectional view, and FIG. 9B is a cross-sectional view of a main part in a vertical direction.

FIGS. 10A and 10B are diagrams showing a state in which the switch of the sliding contact mechanism according to the fourth embodiment turns OFF, FIG. 10A is a horizontal cross-sectional view, and FIG. 10B is a cross-sectional view of the main part in the vertical direction.

FIGS. 11A to 11C are diagrams showing a state in which a switch of a sliding contact mechanism according to a fifth embodiment turns ON, FIG. 11A is a horizontal cross-sectional view, FIG. 11B is a cross-sectional view of a main part in a vertical direction, and FIG. 11C is a cross-sectional view of the vicinity of the sliding contact mechanism when viewed from an outer diameter side.

FIG. 12A is a horizontal cross-sectional view, FIG. 12B is a cross-sectional view of the main part in the vertical direction, and FIG. 12C is a cross-sectional view of the vicinity of the sliding contact mechanism when viewed from the outer diameter side.

FIGS. 13A to 13C are diagrams showing a state in which a switch of a sliding contact mechanism according to a sixth embodiment turns ON, FIG. 13A is a horizontal cross-sectional view, FIG. 13B is a cross-sectional view of a main part in a vertical direction, and FIG. 13C is a cross-sectional view of the vicinity of the sliding contact mechanism when viewed from an outer diameter side.

FIG. 14A is a horizontal cross-sectional view, FIG. 14B is a cross-sectional view of the main part in the vertical direction, and FIG. 14C is a cross-sectional view of the vicinity of the sliding contact mechanism when viewed from the outer diameter side.

FIG. 15 is a diagram FIG. 15B is a cross-sectional view of a main part in a vertical direction, and FIG. 15C is a cross-sectional view of the vicinity of the sliding contact mechanism when viewed from an outer diameter side.

FIG. 16 is a diagram FIG. 16A is a horizontal cross-sectional view, FIG. 16B is a cross-sectional view of the main part in the vertical direction, and FIG. 16C is a cross-sectional view of the vicinity of the sliding contact mechanism when viewed from the outer diameter side.

FIG. 17 is a cross-sectional view of a main part in a vertical direction showing a state in which a switch of a sliding contact mechanism according to an eighth embodiment turns OFF.

FIG. 18 is a top view of a scraper of the sliding contact mechanism according to the eighth embodiment.

FIG. 19 is a cross-sectional view of a main part in a vertical direction showing a state in which a switch of a sliding contact mechanism according to a ninth embodiment turns OFF.

DESCRIPTION OF EMBODIMENTS

Figures 3A, 3B:
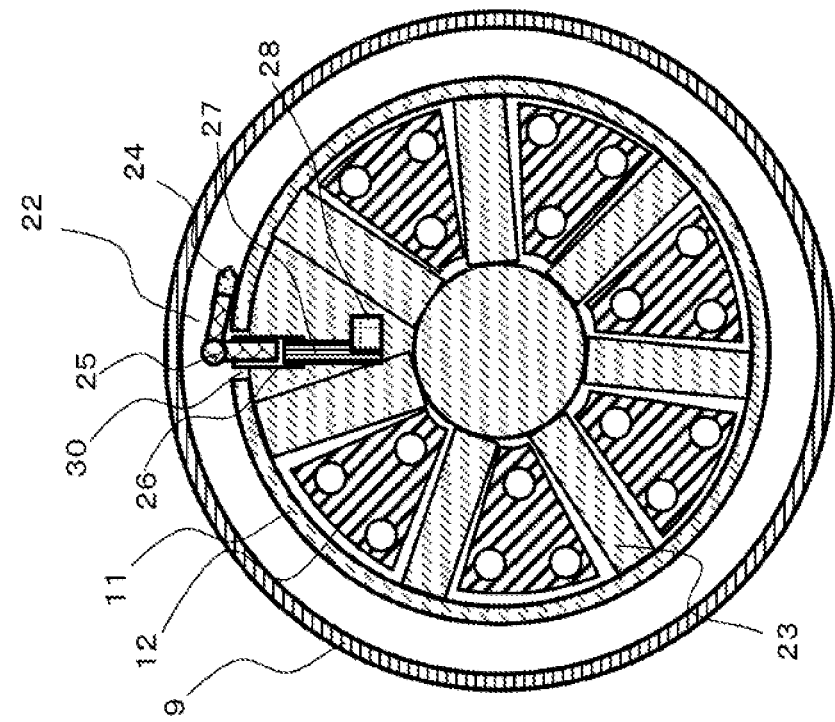
FIGS. 3A and 3B are diagrams showing a state in which a switch of a sliding contact mechanism according to a first embodiment turns ON, FIG. 3A is a horizontal cross-sectional view.

Hereinafter, embodiments of the invention will be described with reference to the drawings. FIG. 1 is a diagram showing an outline of a configuration of an automatic analysis device according to the present embodiment. As shown in FIG. 1, an automatic analysis device 1 according to the present embodiment includes a reagent storage cabinet 2 that stores a reagent, a specimen install unit 3 that installs a specimen, a dispensing mechanism 4 that dispenses the reagent and the specimen, a reaction unit 5 that promotes a reaction by mixing the reagent and the specimen and applying optical or thermodynamic energy, a detection unit 6 that detects fluorescence or the like as a change obtained from the mixture, a control unit 7 that controls these units, and an operation unit 8 that allows a user to perform setting and the like.

Next, the reagent storage cabinet 2 of the present embodiment will be described. FIG. 2 is a cross-sectional view of the reagent storage cabinet 2. As shown in FIG. 2, the reagent storage cabinet 2 includes a pot-shaped housing 9 that constitutes an outer contour of the reagent storage cabinet, reagent racks 12 on which a plurality of reagent containers 21 are mounted, a reagent jacket 11 that is accommodated in the housing 9 and that holds a plurality of reagent racks 12, a lid part 19 that covers the housing 9 from above, and a base 20 that supports the reagent storage cabinet. A heat insulation material 17 for keeping the housing 9 warm is provided outside the housing 9, and a temperature adjustment unit 10 that adjusts a temperature in the reagent storage cabinet is provided below the housing 9. Further, although not shown, the reagent storage cabinet 2 of the present embodiment also includes a sensor that measures the temperature in the reagent storage cabinet, a temperature adjustment control unit that controls the temperature adjustment unit 10, and the like. A specimen may be stored in the reagent storage cabinet 2 besides the reagent.

Here, the reagent jacket 11 is coupled to a rotation shaft 13 by a jacket receiving part 16, and thus when the rotation shaft 13 rotates by a driving force of a motor 15 via a pulley and a belt 14, the reagent jacket 11 rotates integrally with the rotation shaft 13. A plurality of dispensing holes 18 are formed in the lid part 19. In addition, the control unit 7 controls the motor 15 to rotate the reagent jacket 11 such that any reagent container 21 is arranged in the vertical direction together with the dispensing hole 18, and then the dispensing mechanism 4 dispenses the reagent in the reagent container 21 through the dispensing hole 18.

Hereinafter, a sliding contact mechanism 22, which is provided on the reagent jacket 11 and is capable of switching between a state of being in contact with an inner wall surface of the housing 9 and a state of being spaced away from the inner wall surface of the housing 9, will be described based on embodiments.

First Embodiment

The sliding contact mechanism 22 according to the first embodiment will be described with reference to FIGS. 3 and 4. The sliding contact mechanism 22 of the present embodiment removes a water droplet on a side wall of the housing 9 and is provided on the reagent jacket 11, and a switch 28 of the sliding contact mechanism 22 can be manually switched between ON and OFF.

The sliding contact mechanism 22 includes a scraper 24 (sliding contact part), a hinge 25, a scraper plate 26, a movable part 27, the switch 28, and a spring 29. The scraper 24 formed of an elastic material is connected to the scraper plate 26 by the hinge 25, and the scraper plate 26 is coupled to one end of the movable part 27. The other end of the movable part 27 is connected to the switch 28, and a bent part of the movable part 27 moves in a movement part 31 formed in a bottom wall of the reagent jacket 11 in accordance with a state of the switch 28. Further, a slit 30 is formed in a side wall of the reagent jacket 11, and the scraper 24, the hinge 25, and the scraper plate 26 go in and out in a radial direction via the slit 30.

FIG. 3 is a diagram showing a state in which the switch 28 of the sliding contact mechanism 22 turns ON and the sliding contact mechanism 22 is spaced away from the inner wall surface of the housing 9, (a) is a horizontal cross-sectional view, and (b) is a cross-sectional view of a main part in a vertical direction. When manually pressed, the switch 28 of the present embodiment is activated and turned ON. At this time, as shown in FIG. 3, the bent part of the movable part 27 moves inside the movement part 31 toward an outer diameter side, and thus the scraper plate 26 protrudes from the slit 30 toward the outer diameter side. When the scraper plate 26 protrudes, the scraper 24 operates to be folded toward an inner diameter side by the hinge 25, and the scraper 24 is in contact with an outer peripheral surface of the side wall on the outer diameter side of the reagent jacket 11. That is, when the switch 28 is activated, the scraper 24 is not in contact with the side wall of the housing 9.

Figures 4A, 4B:
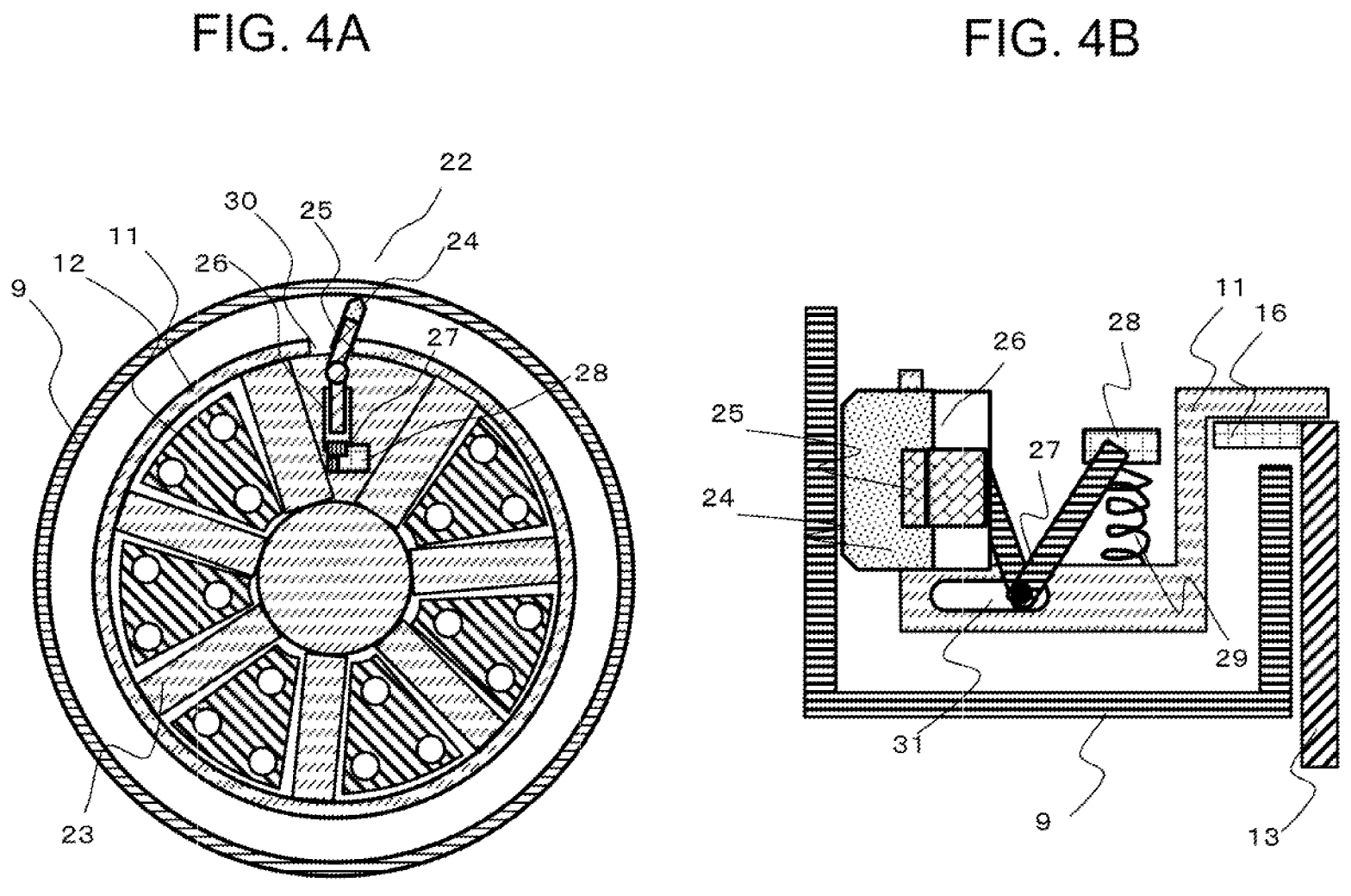

FIG. 4 is a diagram showing a state in which the switch 28 of the sliding contact mechanism 22 turns OFF and the sliding contact mechanism 22 is in contact with the side wall of the housing 9 that faces the outer diameter side of the reagent jacket 11, (a) is a horizontal cross-sectional view, and (b) is a cross-sectional view of the main part in the vertical direction. When the switch 28 is manually opened and turned OFF, as shown in FIG. 4, the other end of the movable part 27 moves upward by an elastic force of the spring 29, and thus the bent part of the movable part 27 moves toward the inner diameter side in the movement part 31, and the scraper plate 26 is pulled in the slit 30. When the scraper plate 26 is pulled in, the scraper 24 operates to stretch toward the outer diameter side by the hinge 25, and the scraper 24 is in contact with the side wall of the housing 9.

The dew condensation water is removed after the switch 28 is turned OFF and the scraper 24 is in contact with the side wall of the housing 9. At this time, the reagent storage cabinet 2 rotates the reagent jacket 11 in conjunction with the jacket receiving part 16 by the rotation of the rotation shaft 13, thereby rotating the scraper 24 while bringing the scraper 24 into contact with the side wall of the housing 9, and removing the dew condensation water adhering to the side wall. The scraper 24 is brought into contact with the inner wall surface of the housing 9 only when the switch 28 is opened, and thus wear of the scraper 24 is limited, and replacement work and the like can be reduced due to life extension of the scraper 24. Further, power for rotating the scraper 24 uses the rotation of the reagent jacket 11, and thus there is an advantage that the dew condensation water can be removed without providing a new rotation mechanism.

The sliding contact mechanism 22 may be configured to come into contact with the side wall on the inner diameter side of the housing 9, and may be configured to concurrently come into contact with the side wall on the outer diameter side of the housing 9. When the configurations are combined, the operation of two sliding contact mechanisms 22 may be switched by one switch 28, or the operation may be switched by individual switches 28. The configuration in which the sliding contact mechanism can be in contact with the side wall on the outer diameter side of the housing 9 is more efficient because an area of the side wall with which the sliding contact mechanism 22 is in contact is large, and thus a large amount of the dew condensation water can be removed.

It is desired that a height region in which the scraper 24 is in contact with the side wall extends to at least above an upper end of the rotation shaft 13. Accordingly, it is possible to bring the scraper 24 into contact with the vicinity of the dispensing hole 18 in which the dew condensation water occurs easily, and it is also possible to expect an effect of causing the dew condensation water at a low position of the side wall to flow down together when the dew condensation water at a high position of the side wall collected by the scraper 24 falls by gravity.

Second Embodiment

The sliding contact mechanism 22 according to the second embodiment will be described with reference to FIGS. 5 and 6. The sliding contact mechanism 22 of the present embodiment removes a water droplet on a side wall of the housing 9, and is provided on a partition 23 of the reagent jacket 11. The switch 28 of the sliding contact mechanism 22 is switched to ON when the reagent rack 12 is bridged over the reagent jacket 11. A basic configuration of the sliding contact mechanism 22 of the present embodiment is the same as that of the first embodiment, and thus only differences from that of the first embodiment will be described below.

The reagent jacket 11 radially includes a plurality of partitions 23 that divides a place over which a plurality of the reagent racks 12 are bridged, and in the present embodiment, the sliding contact mechanism 22 is provided inside the partitions 23. In addition, the reagent rack 12 is bridged at a predetermined position sandwiched by the partitions 23 via an opening (not shown) formed in the lid part 19 of the reagent storage cabinet 2, and the reagent rack 12 can be taken out of the reagent storage cabinet 2.

Figures 5A, 5B:
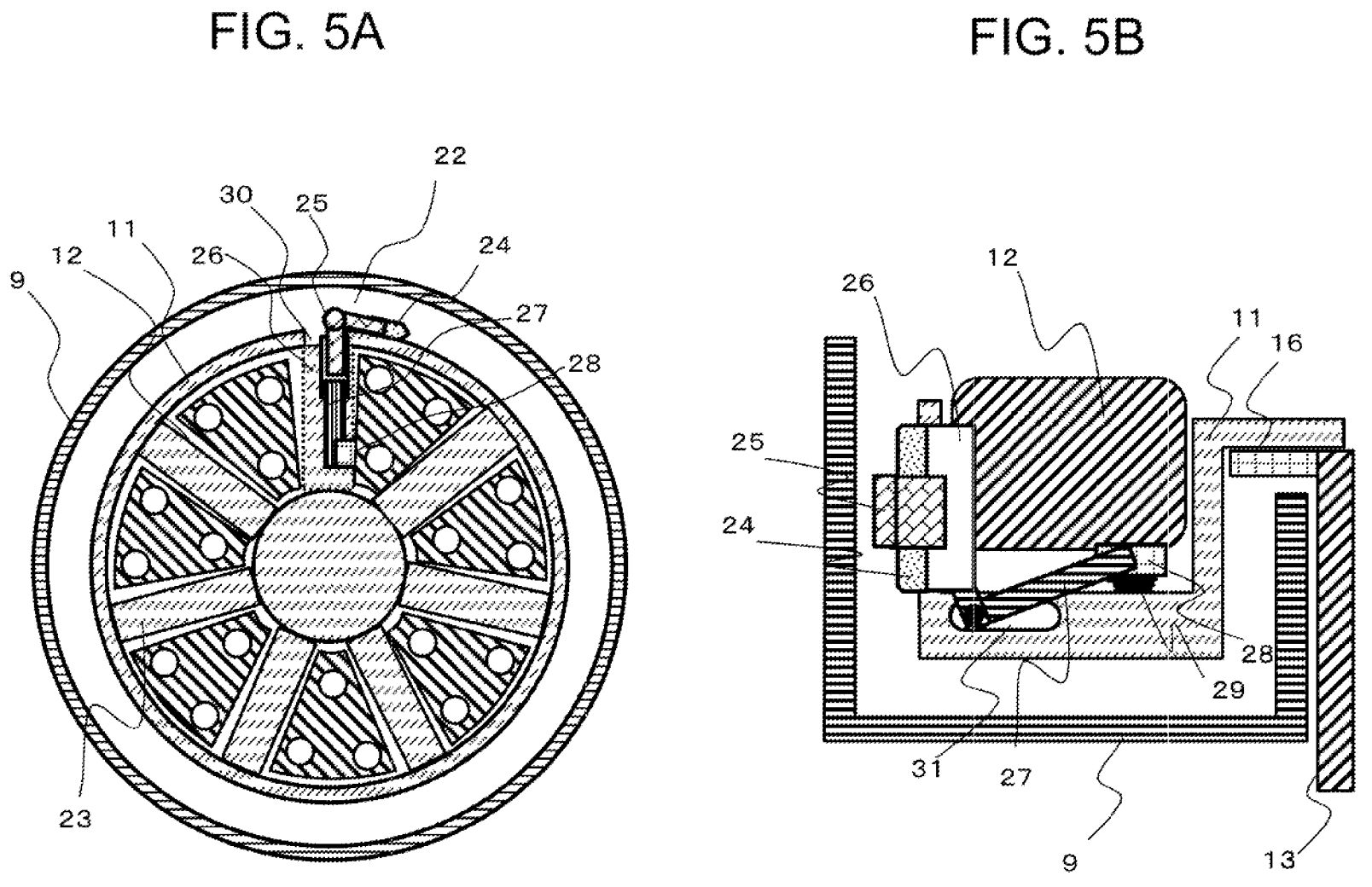

FIG. 5 is a diagram showing a state in which the switch 28 of the sliding contact mechanism 22 turns ON and the sliding contact mechanism 22 is spaced away from the inner wall surface of the housing 9, (a) is a horizontal cross-sectional view, and (b) is a cross-sectional view of a main part in a vertical direction. As shown in FIG. 5, in the present embodiment, when the reagent rack 12 is bridged over the reagent jacket 11, the switch 28 is activated and turned ON, and the scraper 24 is in contact with the outer peripheral surface of the side wall on the outer diameter side of the reagent jacket 11.

Figures 6A, 6B:
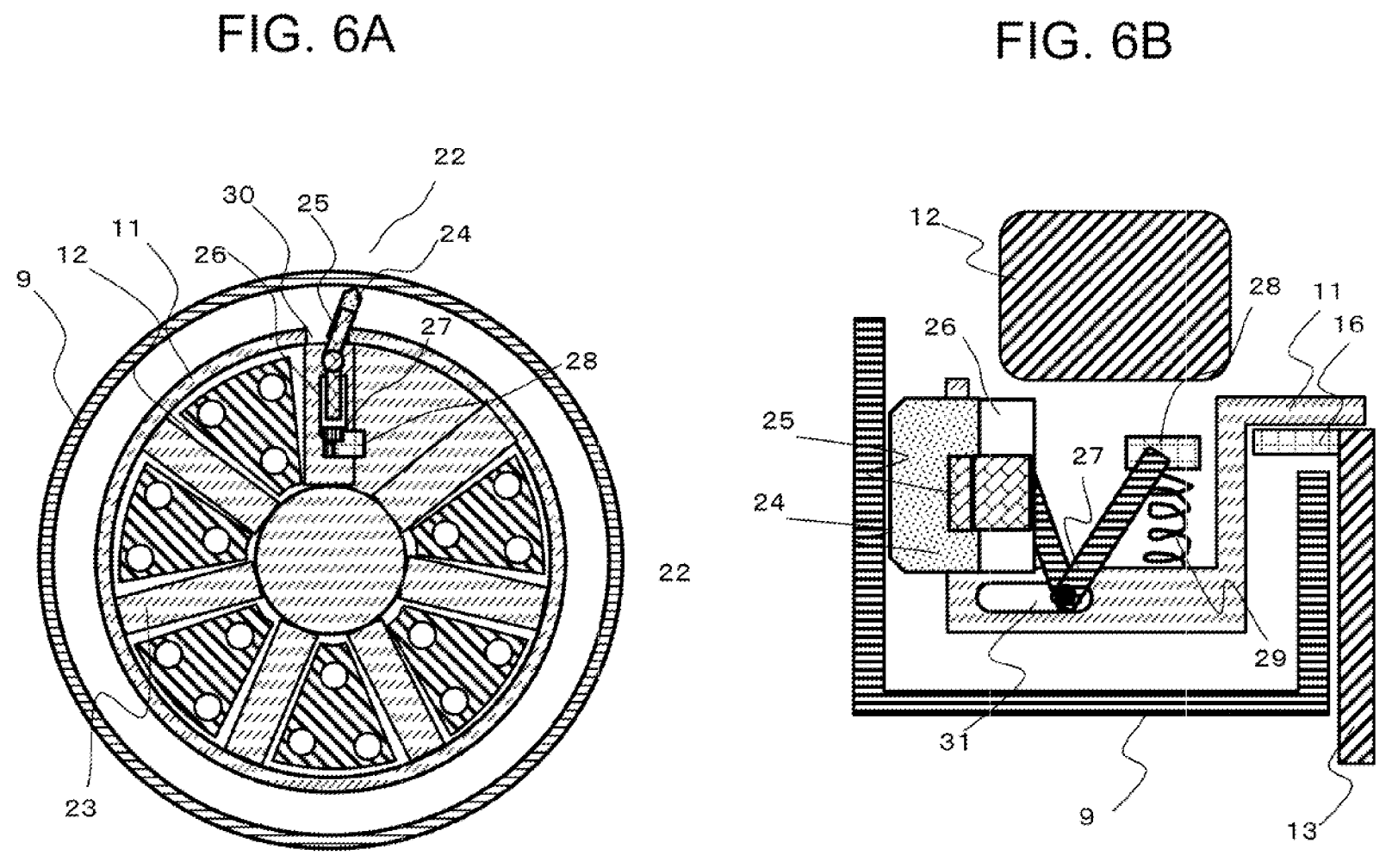

FIG. 6 is a diagram showing a state in which the switch 28 of the sliding contact mechanism 22 turns OFF and the sliding contact mechanism 22 is in contact with the side wall of the housing 9 that faces the outer diameter side of the reagent jacket 11, (a) is a horizontal cross-sectional view, and (b) is a cross-sectional view of the main part in the vertical direction. As shown in FIG. 6, when the reagent rack 12 is taken out, the switch 28 is opened and turned OFF, and the scraper 24 is in contact with the side wall of the housing 9. In this state, when the scraper 24 rotates together with the reagent jacket 11, the dew condensation water adhering to the side wall of the housing 9 is removed.

According to the present embodiment, the switch 28 is automatically switched by bridging the reagent rack 12, and workability is further improved. Since the sliding contact mechanism 22 is disposed inside the partition 23, a space on which the reagent racks 12 are bridged is easily secured on the reagent jacket 11, and the number of the reagent racks 12 that can be bridged can be increased.

Third Embodiment

The sliding contact mechanism 22 according to the third embodiment will be described with reference to FIGS. 7 and 8. The sliding contact mechanism 22 of the present embodiment removes a water droplet on a side wall of the housing 9 and is provided on a hole blocking part 32 of the reagent jacket 11. The switch 28 of the sliding contact mechanism 22 can be manually switched between ON and OFF. A basic configuration of the sliding contact mechanism 22 of the present embodiment is the same as that of the first embodiment, and thus only differences from that of the first embodiment will be described below.

The reagent jacket 11 is provided with the hole blocking part 32, and a plurality of protrusions 36 formed on the hole blocking part 32 are located below the dispensing holes 18 of the lid part 19 in the vertical direction and configured to block the dispensing holes 18. In the present embodiment, the sliding contact mechanism 22 is attached to the reagent jacket 11 by utilizing the space inside the hole blocking part 32.

Figure 7B:
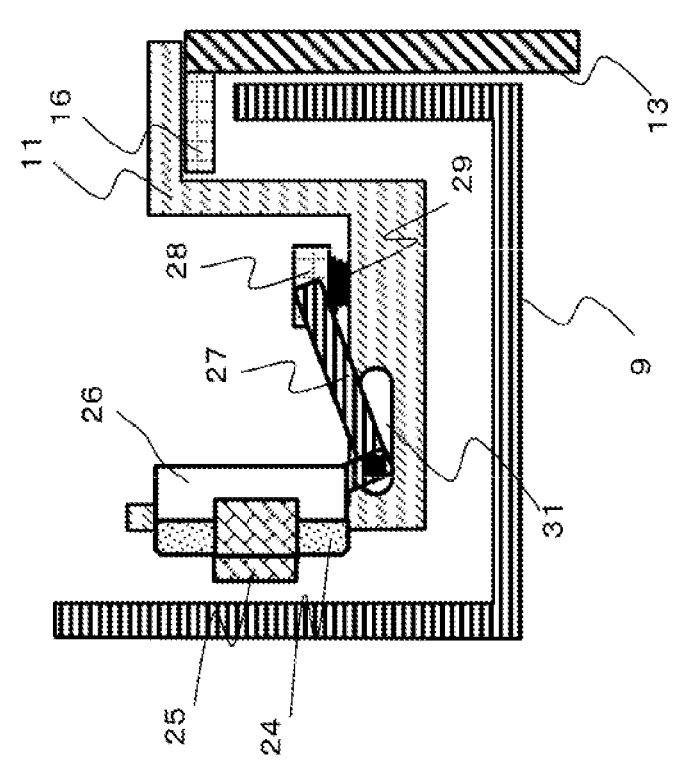
FIGS. 7A and 7B are diagrams showing a state in which a switch of a sliding contact mechanism according to a third embodiment turns ON, FIG. 7A is a horizontal cross-sectional view.
Figure 7A:
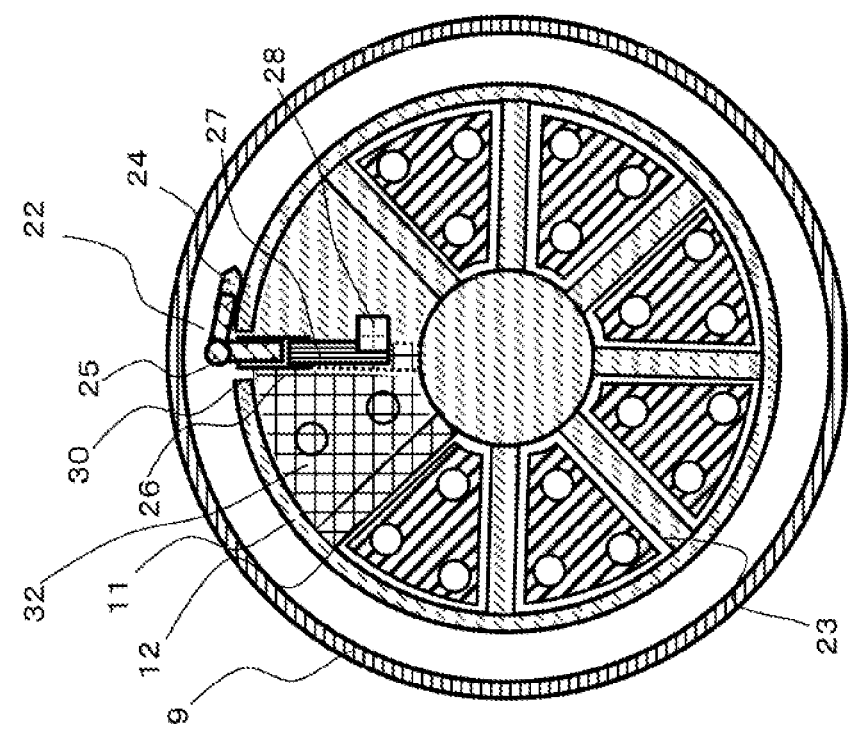

FIG. 7 is a diagram showing a state in which the switch 28 of the sliding contact mechanism 22 turns ON and the sliding contact mechanism 22 is spaced away from the inner wall surface of the housing 9, (a) is a horizontal cross-sectional view, and (b) is a cross-sectional view of the main part in the vertical direction. As shown in FIG. 7, in the present embodiment, when the switch 28 is manually activated and turned ON, the scraper 24 is in contact with the outer peripheral surface of the side wall on the outer diameter side of the reagent jacket 11.

Figure 8B:
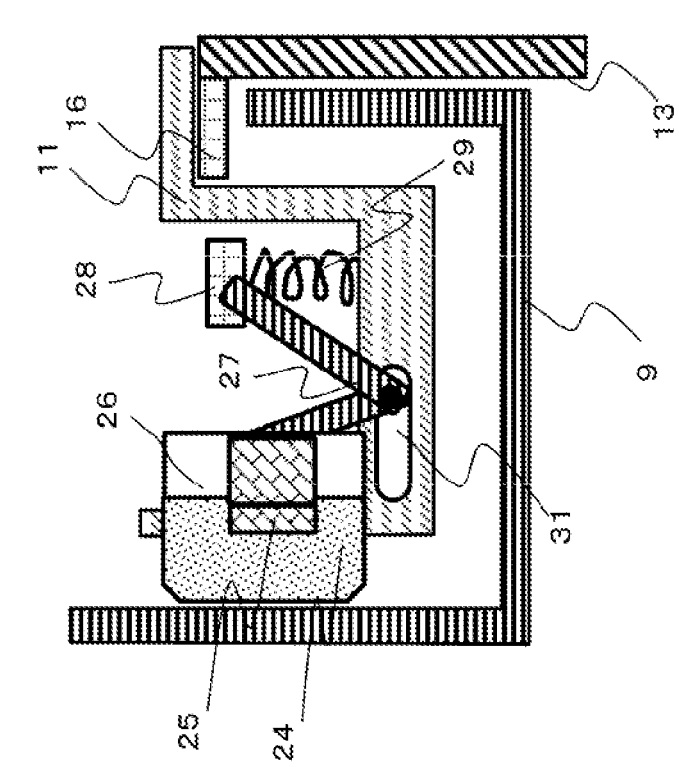
FIGS. 8A and 8B are diagrams showing a state in which the switch of the sliding contact mechanism according to the third embodiment turns OFF.
Figure 8A:
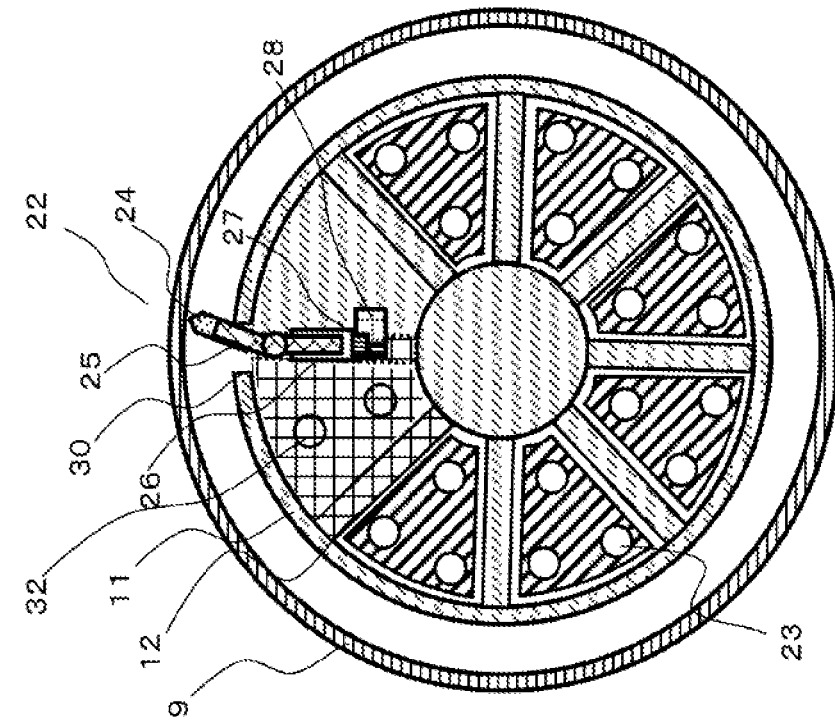

FIG. 8 is a diagram showing a state in which the switch 28 of the sliding contact mechanism 22 turns OFF and the sliding contact mechanism is in contact with the side wall of the housing 9 that faces the outer diameter side of the reagent jacket 11, (a) is a horizontal cross-sectional view, and (b) is a cross-sectional view of the main part in the vertical direction. As shown in FIG. 8, when the switch 28 is manually opened and turned OFF, the scraper 24 is in contact with the side wall of the housing 9. In this state, when the scraper 24 rotates together with the reagent jacket 11, the dew condensation water adhering to the side wall of the housing 9 is removed.

In the present embodiment, by providing the sliding contact mechanism 22 on the hole blocking part 32, a width dimension of each partition 23 can be reduced, and thus there is an advantage that an interval between adjacent partitions 23 is increased, and the space over which the reagent rack 12 can be bridged is widened.

Fourth Embodiment

The sliding contact mechanism 22 according to the fourth embodiment will be described with reference to FIGS. 9 and 10. Similar to the third embodiment, the sliding contact mechanism 22 of the present embodiment is provided on the hole blocking part 32 of the reagent jacket 11, and the switch 28 of the sliding contact mechanism 22 is switched to ON when the reagent rack 12 is bridged over the reagent jacket 11 as in the second embodiment.

Figures 9A, 9B:
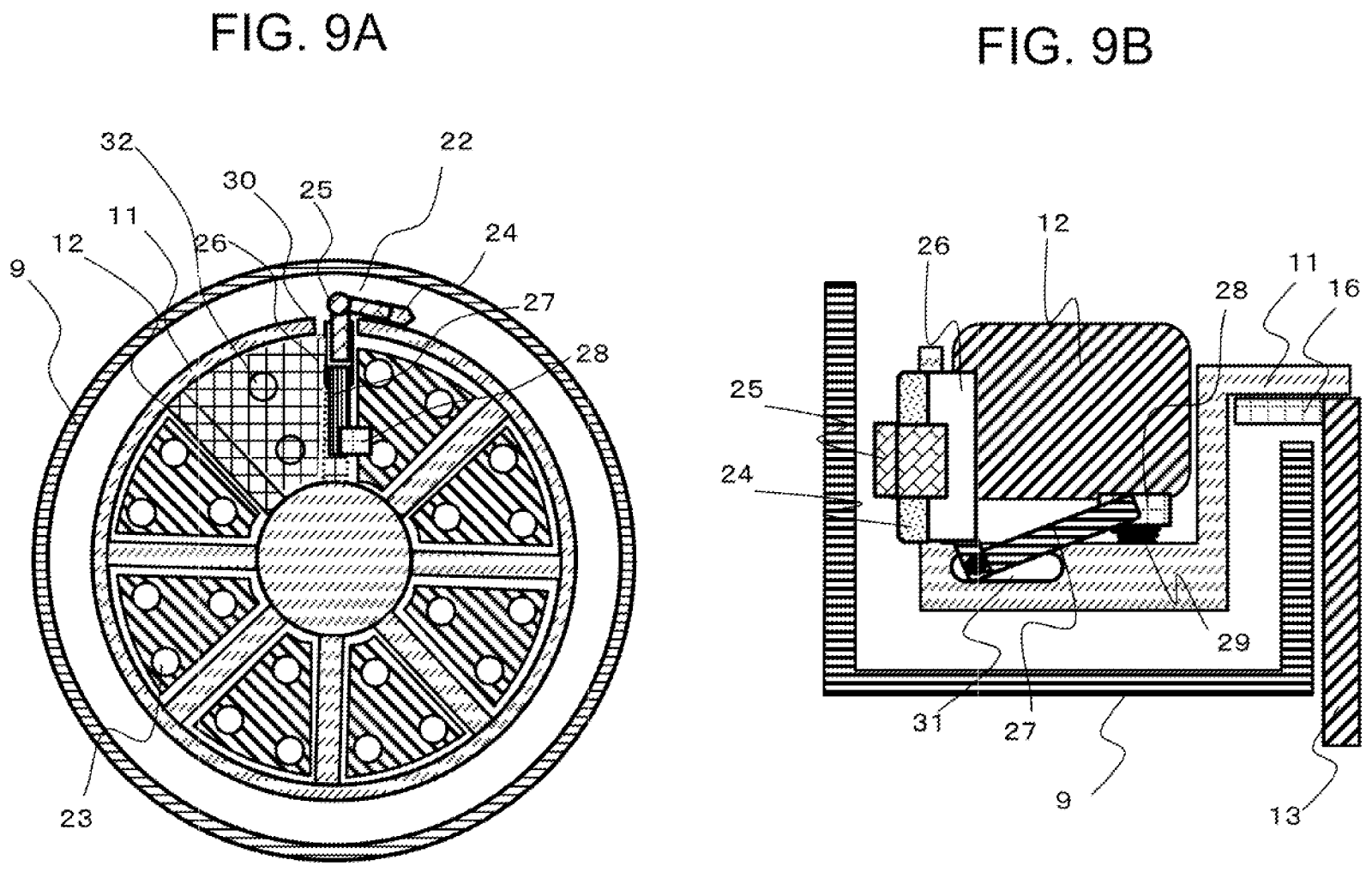

FIG. 9 is a diagram showing a state in which the switch 28 of the sliding contact mechanism 22 turns ON and the sliding contact mechanism 22 is spaced away from the inner wall surface of the housing 9, (a) is a horizontal cross-sectional view, and (b) is a cross-sectional view of the main part in the vertical direction. As shown in FIG. 9, when the reagent rack 12 is bridged over the reagent jacket 11, the switch 28 is activated and turned ON, and the scraper 24 is in contact with the outer peripheral surface of the side wall on the outer diameter side of the reagent jacket 11.

Figures 10A, 10B:
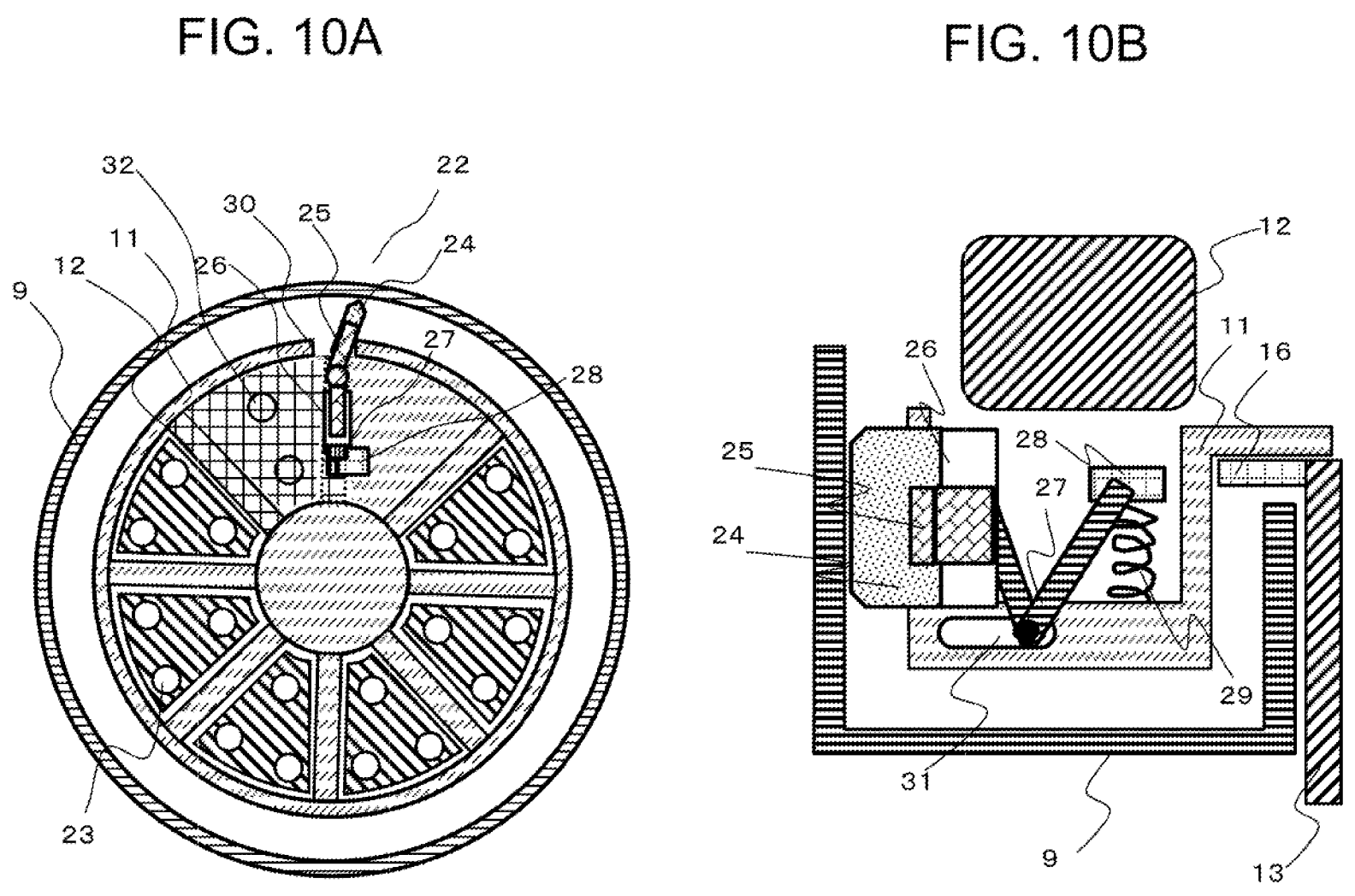

FIG. 10 is a diagram showing a state in which the switch 28 of the sliding contact mechanism 22 turns OFF and the sliding contact mechanism 22 is in contact with the side wall of the housing 9 that faces the outer diameter side of the reagent jacket 11, (a) is a horizontal cross-sectional view, and (b) is a cross-sectional view of the main part in the vertical direction. As shown in FIG. 10, when the reagent rack 12 is taken out, the switch 28 is opened and turned OFF, and the scraper 24 is in contact with the side wall of the housing 9. In this state, when the scraper 24 rotates together with the reagent jacket 11, the dew condensation water adhering to the side wall of the housing 9 is removed.

Fifth Embodiment

The sliding contact mechanism 22 according to the fifth embodiment will be described with reference to FIGS. 11 and 12. The sliding contact mechanism 22 of the present embodiment removes a water droplet on a bottom wall of the housing 9 and is provided on the reagent jacket 11, and the switch 28 of the sliding contact mechanism 22 can be manually switched between ON and OFF.

The sliding contact mechanism 22 of the present embodiment includes the scraper 24 (sliding contact part), the scraper plate 26, the movable part 27, the switch 28, and the spring 29. The scraper 24 is connected to the scraper plate 26, and the scraper plate 26 is coupled to one end of the movable part 27. The other end of the movable part 27 is connected to the switch 28, and the bent part of the movable part 27 moves in the movement part 31 formed in the bottom wall of the reagent jacket 11 in accordance with a state of the switch 28. Further, the slit 30 is formed in the bottom wall of the reagent jacket 11, and the scraper 24 and the scraper plate 26 go in and out in the vertical direction through the slit 30.

FIG. 11 is a diagram showing a state in which the switch 28 of the sliding contact mechanism 22 turns ON and the sliding contact mechanism 22 is spaced away from the inner wall surface of the housing 9, (a) is a horizontal cross-sectional view, (b) is a cross-sectional view of the main part in the vertical direction, and (c) is a cross-sectional view of the vicinity of the sliding contact mechanism when viewed from an outer diameter side. When manually pressed, the switch 28 of the present embodiment is activated and turned ON. At this time, as shown in FIG. 11, the bent part of the movable part 27 moves to both ends in a radial direction in the movement part 31, and thus the scraper plate 26 is pulled upward in the slit 30. When the scraper plate 26 is pulled in, the scraper 24 operates to be folded upward by the hinge 25, and the scraper 24 is in contact with the outer peripheral surface of the bottom wall of the reagent jacket 11. That is, when the switch 28 is activated, the scraper 24 is not in contact with the bottom wall of the housing 9.

Figures 12A, 12B, 12C:
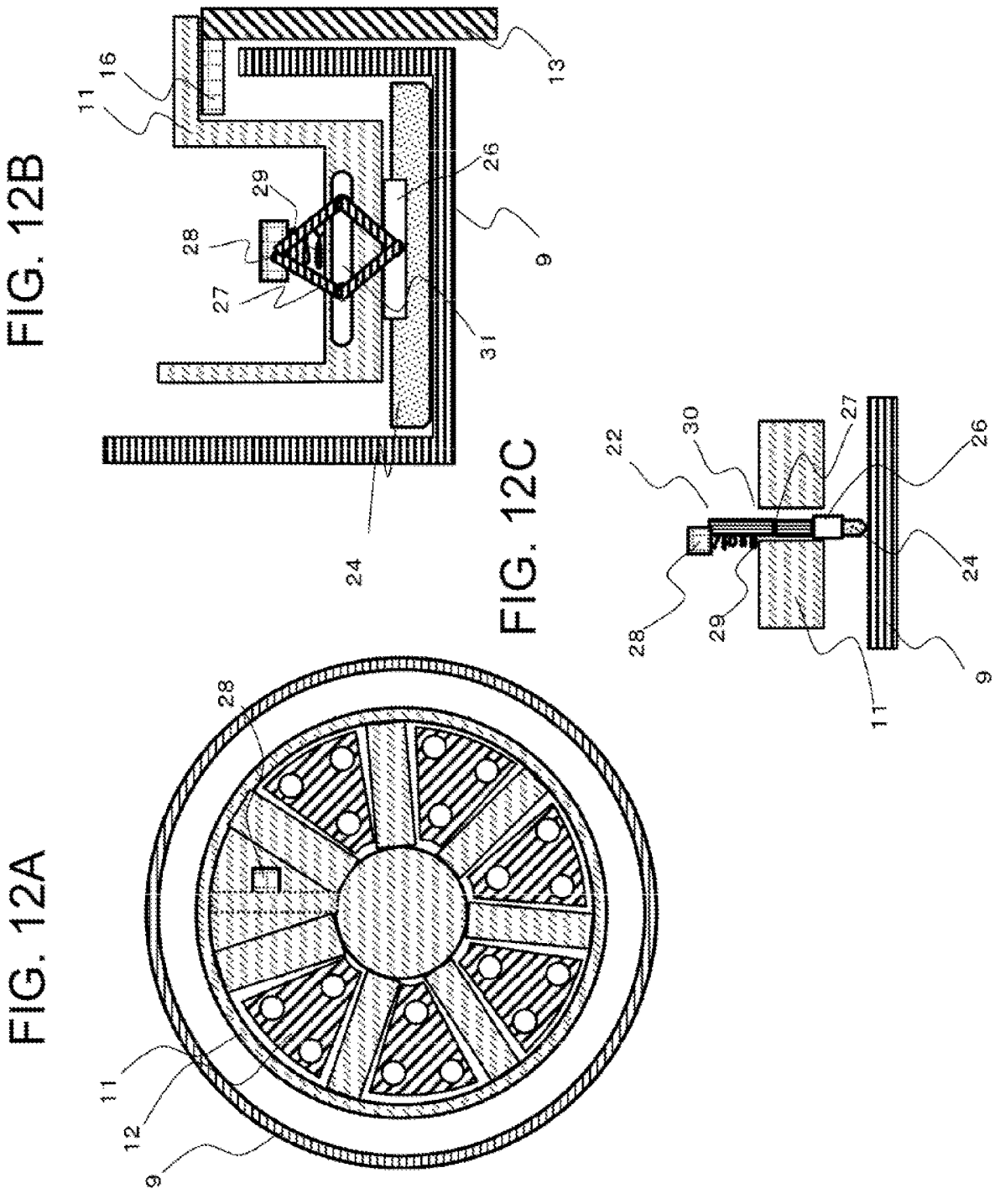
FIGS. 12A to 12C are diagrams showing a state in which the switch of the sliding contact mechanism according to the fifth embodiment turns OFF.

FIG. 12 is a diagram showing a state in which the switch 28 of the sliding contact mechanism 22 turns OFF and the sliding contact mechanism 22 is in contact with the bottom wall of the housing 9, (a) is a horizontal cross-sectional view, (b) is a cross-sectional view of the main part in the vertical direction, and (c) is a cross-sectional view of the vicinity of the sliding contact mechanism when viewed from the outer diameter side. When the switch 28 is manually opened and turned OFF, as shown in FIG. 12, the other end of the movable part 27 moves upward by an elastic force of the spring 29, and thus the bent part of the movable part 27 moves toward an intermediate side in the movement part 31, and the scraper plate 26 protrudes downward in the slit 30. When the scraper plate 26 protrudes, the scraper 24 operates to protrude downward, and the scraper 24 is in contact with the bottom wall of the housing 9. In this state, when the scraper 24 rotates together with the reagent jacket 11, the dew condensation water adhering to the bottom wall of the housing 9 that faces a lower side of the reagent jacket 11 is removed.

Sixth Embodiment

The sliding contact mechanism 22 according to the sixth embodiment will be described with reference to FIGS. 13 and 14. The sliding contact mechanism 22 of the present embodiment removes a water droplet on the bottom wall of the housing 9 and is provided on the partition 23 of the reagent jacket 11, and the switch 28 of the sliding contact mechanism 22 is switched to ON when the reagent rack 12 is bridged over the reagent jacket 11. A basic configuration of the sliding contact mechanism 22 of the present embodiment is the same as that of the fifth embodiment, and thus only differences from that of the fifth embodiment will be described below.

FIG. 13 is a diagram showing a state in which the switch 28 of the sliding contact mechanism 22 turns ON and the sliding contact mechanism 22 is spaced away from the inner wall surface of the housing 9, (a) is a horizontal cross-sectional view, (b) is a cross-sectional view of the main part in the vertical direction, and (c) is a cross-sectional view of the vicinity of the sliding contact mechanism when viewed from the outer diameter side. As shown in FIG. 13, when the reagent rack 12 is bridged over the reagent jacket 11, the switch 28 is activated and turned ON, and the scraper 24 is in contact with the outer peripheral surface of the bottom wall of the reagent jacket 11.

Figures 14A, 14B, 14C:
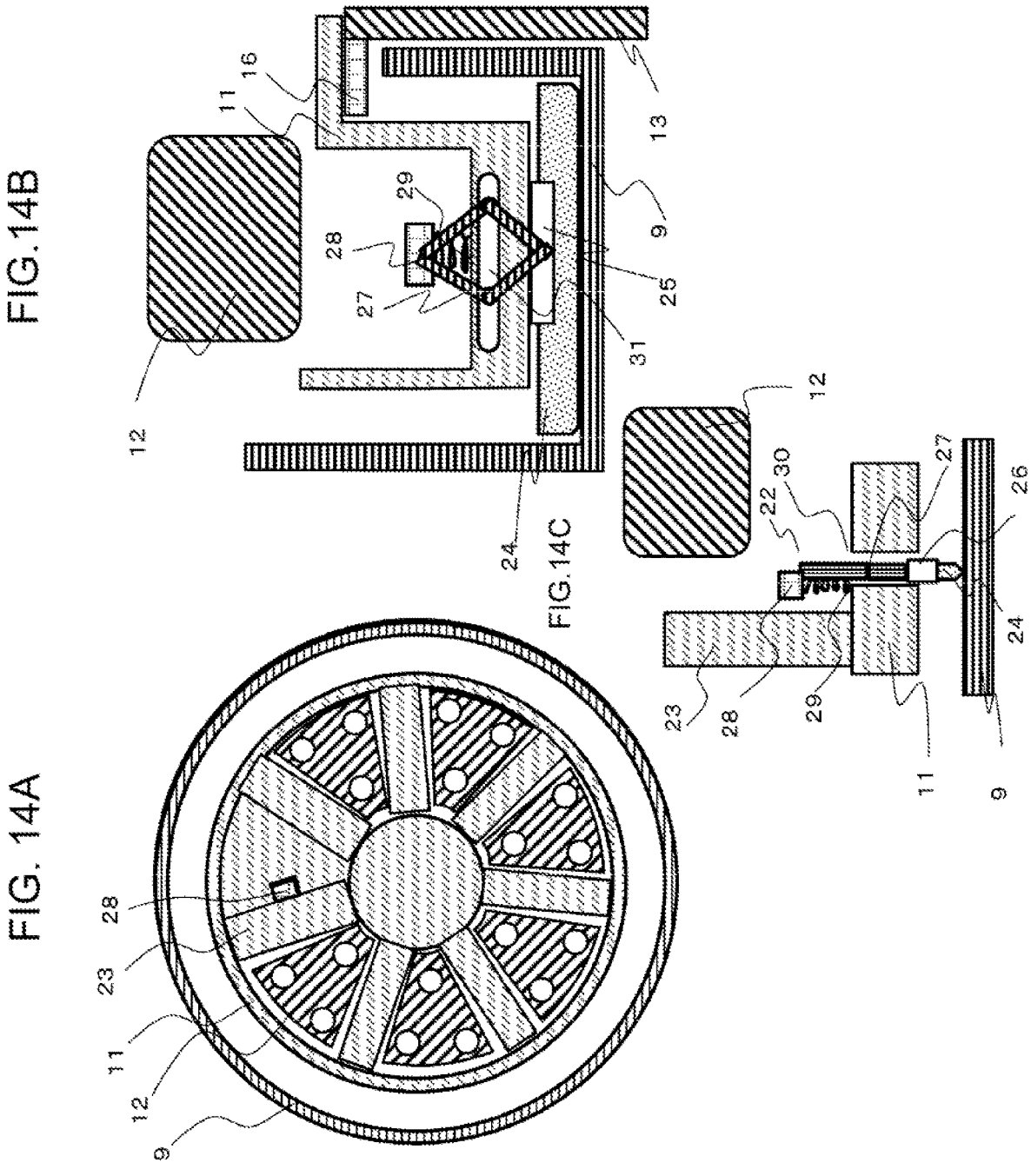
FIGS. 14A to 14C are diagrams showing a state in which the switch of the sliding contact mechanism according to the sixth embodiment turns OFF.

FIG. 14 is a diagram showing a state in which the switch 28 of the sliding contact mechanism 22 turns OFF and the sliding contact mechanism 22 is in contact with the bottom wall of the housing 9, (a) is a horizontal cross-sectional view, (b) is a cross-sectional view of the main part in the vertical direction, and (c) is a cross-sectional view of the vicinity of the sliding contact mechanism when viewed from the outer diameter side. As shown in FIG. 14, when the reagent rack 12 is taken out, the switch 28 is opened and turned OFF, and the scraper 24 is in contact with the bottom wall of the housing 9. In this state, when the scraper 24 rotates together with the reagent jacket 11, the dew condensation water adhering to the bottom wall of the housing 9 is removed.

Seventh Embodiment

The sliding contact mechanism 22 according to the seventh embodiment will be described with reference to FIGS. 15 and 16. The sliding contact mechanism 22 of the present embodiment removes a water droplet on the bottom wall of the housing 9 and is provided on the hole blocking part 32 of the reagent jacket 11, and the switch 28 of the sliding contact mechanism 22 is switched to ON when the reagent rack 12 is bridged over the reagent jacket 11.

Figures 15A, 15B, 15C:
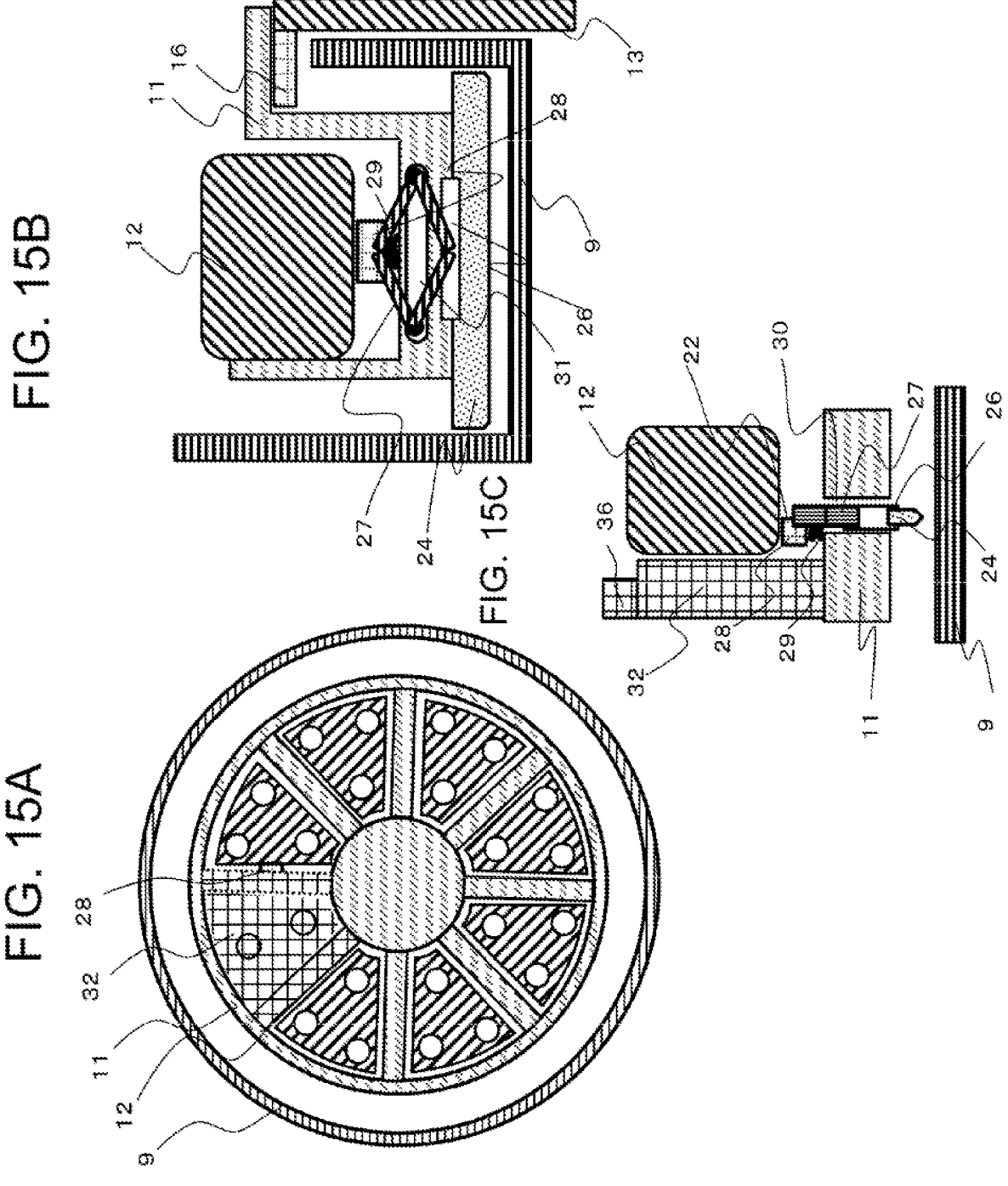
FIGS. 15A to 15C are diagrams showing a state in which a switch of a sliding contact mechanism according to a seventh embodiment turns ON, FIG. 15A is a horizontal cross-sectional view.

FIG. 15 is a diagram showing a state in which the switch 28 of the sliding contact mechanism 22 turns ON and the sliding contact mechanism 22 is spaced away from the inner wall surface of the housing 9, (a) is a horizontal cross-sectional view, (b) is a cross-sectional view of the main part in the vertical direction, and (c) is a cross-sectional view of the vicinity of the sliding contact mechanism when viewed from the outer diameter side. As shown in FIG. 15, when the reagent rack 12 is bridged over the reagent jacket 11, the switch 28 is activated and turned ON, and the scraper 24 is in contact with the outer peripheral surface of the bottom wall of the reagent jacket 11.

Figures 16A, 16B, 16C:
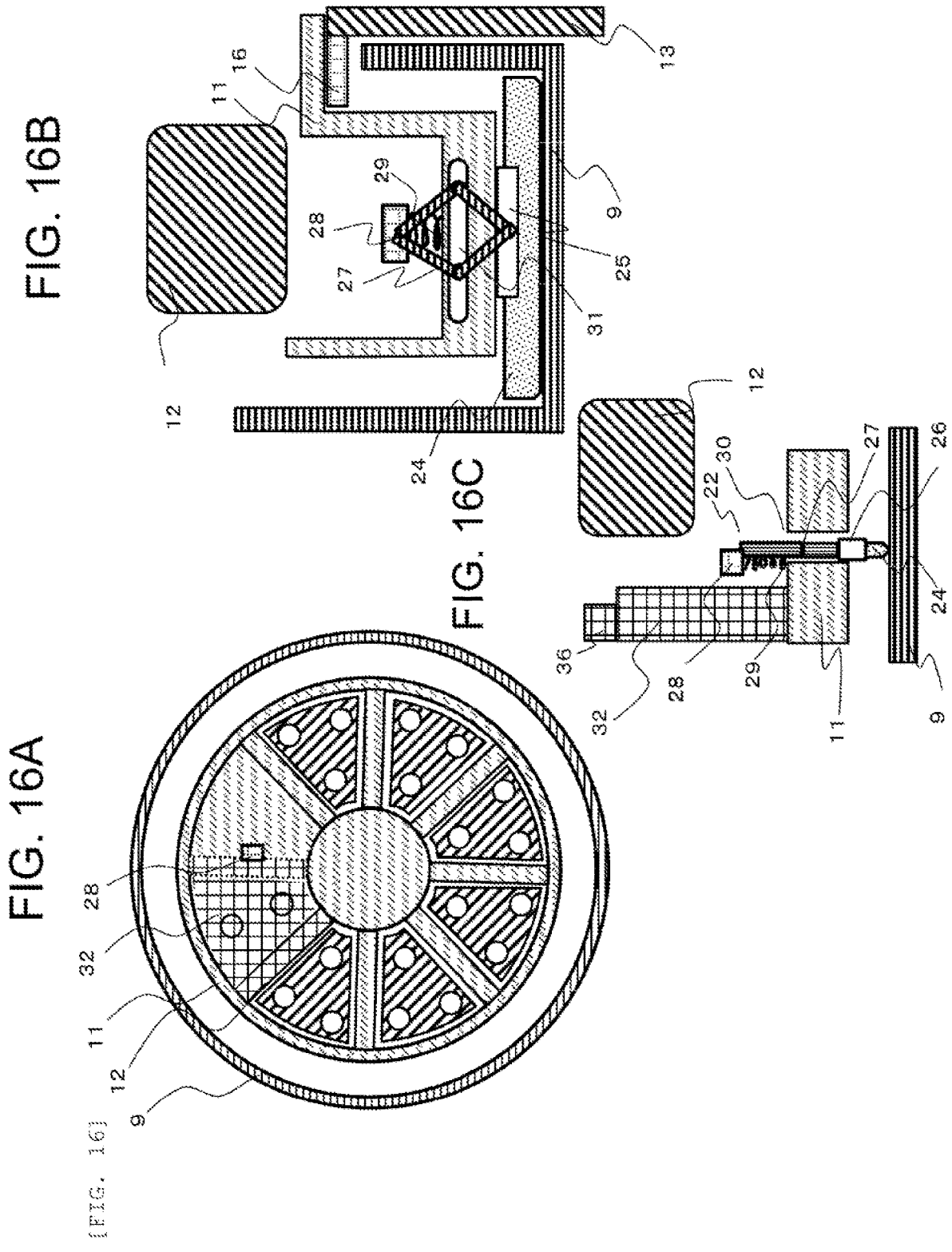
FIGS. 16A to 16C are diagrams showing a state in which the switch of the sliding contact mechanism according to the seventh embodiment turns OFF.

FIG. 16 is a diagram showing a state in which the switch 28 of the sliding contact mechanism 22 turns OFF and the sliding contact mechanism 22 is in contact with the bottom wall of the housing 9, (a) is a horizontal cross-sectional view, (b) is a cross-sectional view of the main part in the vertical direction, and (c) is a cross-sectional view of the vicinity of the sliding contact mechanism when viewed from the outer diameter side. As shown in FIG. 16, when the reagent rack 12 is taken out, the switch 28 is opened and turned OFF, and the scraper 24 is in contact with the bottom wall of the housing 9. In this state, when the scraper 24 rotates together with the reagent jacket 11, the dew condensation water adhering to the bottom wall of the housing 9 is removed.

The switch 28 of the sliding contact mechanism 22 according to the present embodiment may be manually switched between ON and OFF as in the first, third, and fifth embodiments.

Eighth Embodiment

The sliding contact mechanism 22 according to the eighth embodiment will be described with reference to FIGS. 17 and 18. The sliding contact mechanism 22 of the present embodiment removes a water droplet on the bottom wall of the housing 9, and a drain hole 33 through which the dew condensation water is discharged is formed in the bottom wall of the housing 9.

FIG. 17 is a diagram showing a state in which the switch 28 of the sliding contact mechanism 22 turns OFF and the sliding contact mechanism 22 is in contact with the bottom wall of the housing 9. FIG. 18 is a top view of the scraper 24 of the sliding contact mechanism 22. As shown in FIG. 18, in the scraper 24 of the present embodiment, a concave surface 34 is formed at a radial position corresponding to the drain hole 33 in the bottom wall of the housing 9. Therefore, when the scraper 24 rotates in a direction in which the concave surface 34 is formed, the dew condensation water gradually gathers at a position at which the drain hole 33 resides, and the dew condensation water can be efficiently discharged to the outside of the reagent storage cabinet.

Ninth Embodiment

The sliding contact mechanism 22 according to the ninth embodiment will be described with reference to FIG. 19. The sliding contact mechanism 22 of the present embodiment removes a water droplet on the bottom wall of the housing 9, and a concave part 35 is formed in an inner surface of the bottom wall of the housing 9.

FIG. 19 is a diagram showing a state in which the switch 28 of the sliding contact mechanism 22 turns OFF and the sliding contact mechanism 22 is in contact with the bottom wall of the housing 9. As shown in FIG. 19, the temperature adjustment unit 10 is located below the concave part 35 formed in the bottom wall of the housing 9 in the vertical direction. Therefore, the dew condensation water is collected in the concave part 35 by the rotation of the scraper 24, and the collected dew condensation water is efficiently heated by the temperature adjustment unit 10 located below. The dew condensation water is evaporated when heated, and is diffused into the automatic analysis device 1 outside the reagent storage cabinet 2 through the dispensing hole 18 and the like.

A plurality of temperature adjustment units 10 are provided below the bottom wall of the housing 9 in a circumferential direction, and thus it is desirable that a plurality of concave parts 35 of the housing 9 are formed at positions corresponding to the temperature adjustment units 10. Further, when the concave part 35 of the housing 9 is located in the vicinity of the lower side of a vertical projection of the dispensing hole 18, there is also an advantage that moisture evaporated in the temperature adjustment unit 10 easily flows from the dispensing hole 18 to the outside of the reagent storage cabinet 2. A size and a shape of the concave part 35 are not limited to the size and the shape shown in FIG. 19, and the temperature adjustment unit 10 and at least a part of the vertical projection of the concave part 35 may overlap with each other.

The embodiments described above have been described in detail for easy understanding of the invention, and are not necessarily limited to those having all the configurations described above. A part of the configuration of the embodiments may be added to, deleted from, or replaced with another configuration. Further, a configuration of another embodiment can be added to the configuration of one embodiment.

REFERENCE SIGNS LIST

1: automatic analysis device
2: reagent storage cabinet
3: specimen install unit
4: dispensing mechanism
5: reaction unit
6: detection unit
7: control unit
8: operation unit
9: housing
10: temperature adjustment unit
11: reagent jacket
12: reagent rack
13: rotation shaft
14: belt
15: motor
16: jacket receiving part
17: heat insulation material
18: dispensing hole
19: lid part
20: base
21: reagent container
22: sliding contact mechanism
23: partition
24: scraper
25: hinge
26: scraper plate
27: movable part
28: switch
29: spring
30: slit
31: movement part
32: hole blocking part
33: drain hole
34: concave surface
35: concave part
36: protrusion

The invention claimed is:

1. An automatic analysis device comprising:
a switch;
a control unit;
a dispensing mechanism configured to dispense a reagent contained in a reagent container;
a rotation shaft;
a motor coupled to the rotation shaft, and
a reagent storage cabinet that stores a plurality of reagent containers, wherein the reagent storage cabinet includes
   a reagent jacket mounted to the rotation shaft and configured to rotate while holding the plurality of reagent containers,
   a housing that accommodates the reagent jacket,
   a lid part that is fixed to the housing from above and that has formed therein a dispensing hole for dispensing a reagent inside the plurality of reagent containers, and a sliding contact mechanism mounted on the reagent jacket and comprising a scraper formed of an elastic material, a scraper plate supporting the scraper, a hinge connecting the scraper to the scraper plate, a movable member connected to the scraper plate, and a spring biasing the movable member,
wherein the control unit is configured to drive the motor that rotates the rotation shaft to rotate the reagent jacket, the switch is configured to switch the sliding contact mechanism between a state of the scraper being in contact with an inner wall surface of the housing and a state of the scraper being spaced away from the inner wall surface of the housing,
the reagent jacket has a hole blocking part positioned beneath the dispensing hole, and
the sliding contact mechanism is provided on the hole blocking part.

2. The automatic analysis device according to claim 1, further comprising a reagent rack configured to be removably mounted on the reagent jacket, wherein the plurality of reagent containers are mounted on the reagent rack;
   when the reagent rack on which the plurality of reagent containers are mounted is suspended on the reagent jacket, the switch causes the sliding contact mechanism to be in the state of being spaced away from the inner wall surface of the housing, and
   when the reagent rack is detached from the reagent jacket, the switch causes the sliding contact mechanism to be in the state of being in contact with the inner wall surface of the housing.

3. The automatic analysis device according to claim 1, wherein
   the scraper of the sliding contact mechanism is configured to be brought into contact with a side wall of the housing that faces an outer diameter side of the reagent jacket.

4. The automatic analysis device according to claim 3, wherein
   the reagent jacket has a radial partition that divides adjacent reagent rack mounting regions, and
   the sliding contact mechanism is provided within the partition.

5. The automatic analysis device according to claim 1, wherein
   the scraper of the sliding contact mechanism is configured to be brought into contact with a bottom wall of the housing that faces below the reagent jacket.

6. The automatic analysis device according to claim 5, wherein
   a drain hole that discharges dew condensation water is formed in the bottom wall of the housing, and
   the scraper includes a concave surface positioned to guide dew condensation water toward the drain hole as the reagent jacket rotates.

7. The automatic analysis device according to claim 5, further comprising
   a temperature adjustment unit that adjusts a temperature in the reagent storage cabinet is provided beneath and directly thermally coupled to the bottom wall of the housing,
   a concave part formed in an inner surface of the bottom wall of the housing, and
   a vertical projection of at least a portion of the concave part overlaps with the temperature adjustment unit.

* * * * *